United States Patent [19]

Reinert

[11] 3,924,826
[45] Dec. 9, 1975

[54] ROTATABLE WINDOW MEANS
[75] Inventor: Milton J. Reinert, Florissant, Mo.
[73] Assignee: The United States of America as represented by the Secretary of the Air Force, Washington, D.C.
[22] Filed: Dec. 20, 1974
[21] Appl. No.: 535,060

[52] U.S. Cl. ............... 244/129 W; 49/40; 244/3.16
[51] Int. Cl.² .......................................... B64C 1/14
[58] Field of Search ........... 244/129 W, 129 R, 119, 244/120, 3.16, 3.17, 168, 171; 49/40, 41; 296/64

[56] References Cited
UNITED STATES PATENTS
2,708,136  5/1955  Norris .......................... 244/129 W X
3,050,790  8/1962  Wakefield .................... 244/129 W X FOREIGN PATENTS OR APPLICATIONS
1,293,602  4/1962  France ........................... 244/129 W Primary Examiner—George E. A. Halvosa
Assistant Examiner—Paul E. Sauberer
Attorney, Agent, or Firm—Joseph E. Rusz; Arsen Tashjian

[57] ABSTRACT

A window adapted for use with an aircraft to provide window capability (i.e., visibility) for scanning and for looking out over wide angular regions while the aircraft is in a flight mode. The inventive window includes: a rotatable band positioned to form the external surface of the fuselage immediately aft of the aerodynamically configured nose section, and with the band completely rotatable about the roll axis of the aircraft; and, a window envelope which includes a transparent windowpane that is flush-mounted in an opening in the rotatable band, that is hingedly connected at its fore end edge to the opening, and that can be moved outwardly into the airstream at its aft end edge. The flush configuration position (i.e., the closed or retracted mode) of the windowpane provides angular coverage of from 30° to 150° off of the nose of the aircraft, and the outward position (i.e., the extended mode) of the windowpane into the airstream provides coverage in the 0° to 30° region off of the nose of the aircraft. Unlike the prior art structures, this inventive window obviates the need for pods, turret structures, and the like which extend beyond the mold line of the aircraft. Thereby, the window eliminates or minimizes drag; and, it also completely eliminates shadowing by the aircraft, an inherent problem for which a solution has been long sought.

4 Claims, 3 Drawing Figures

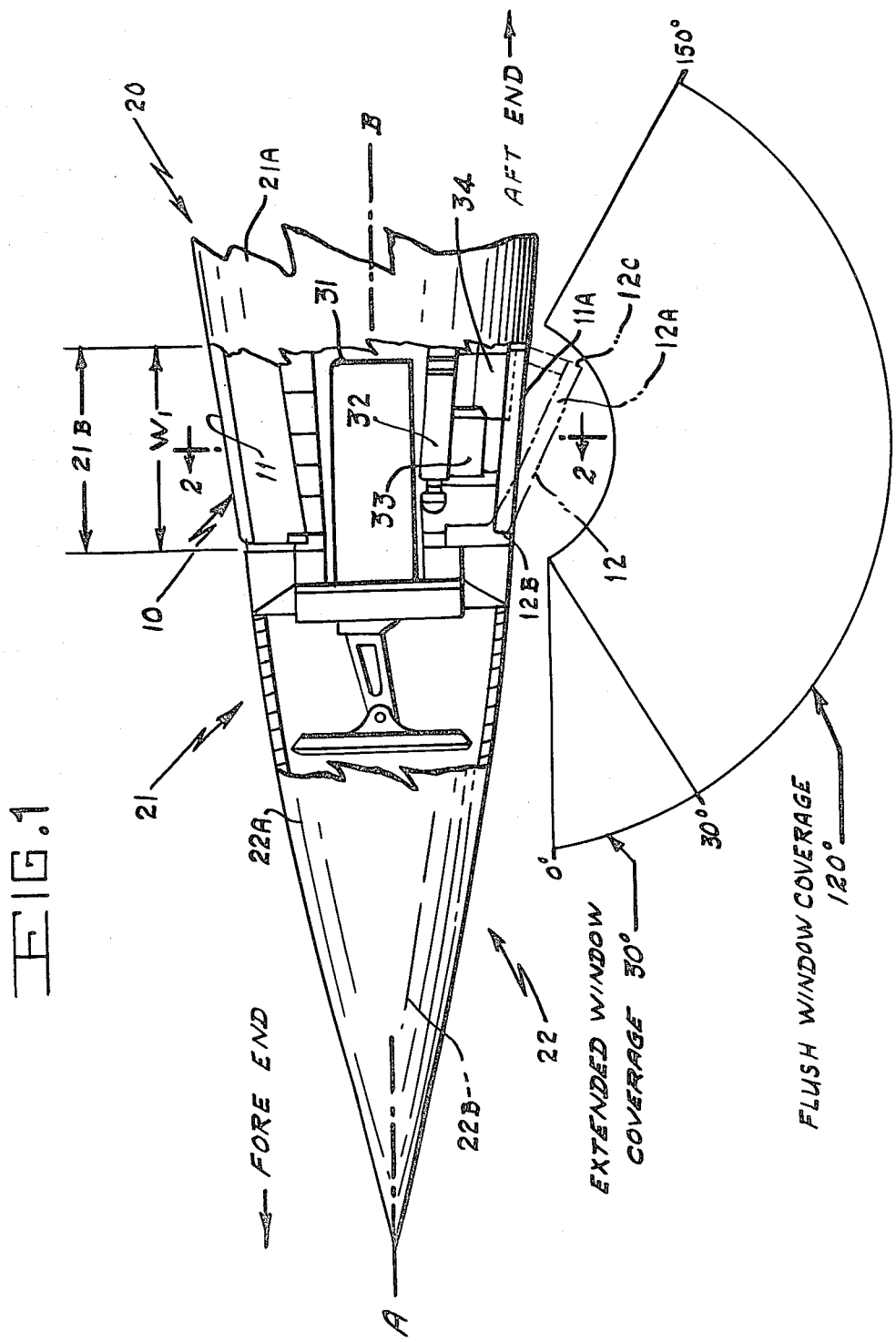

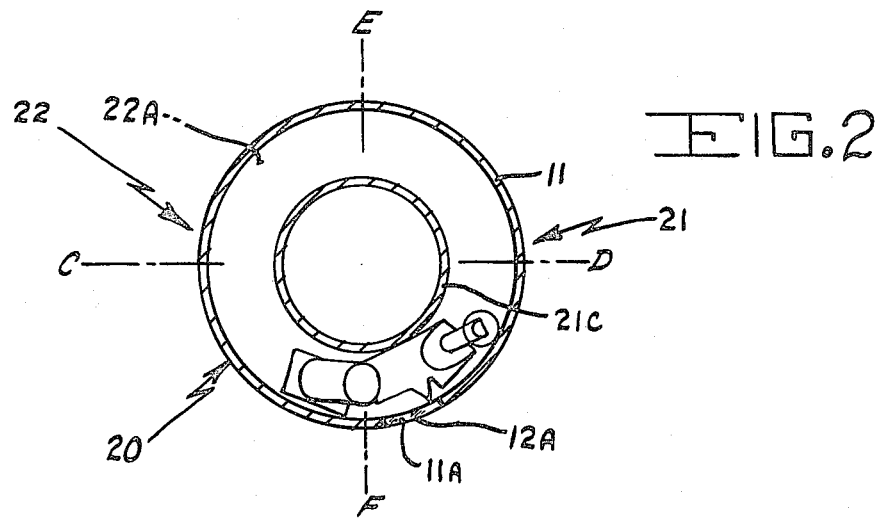
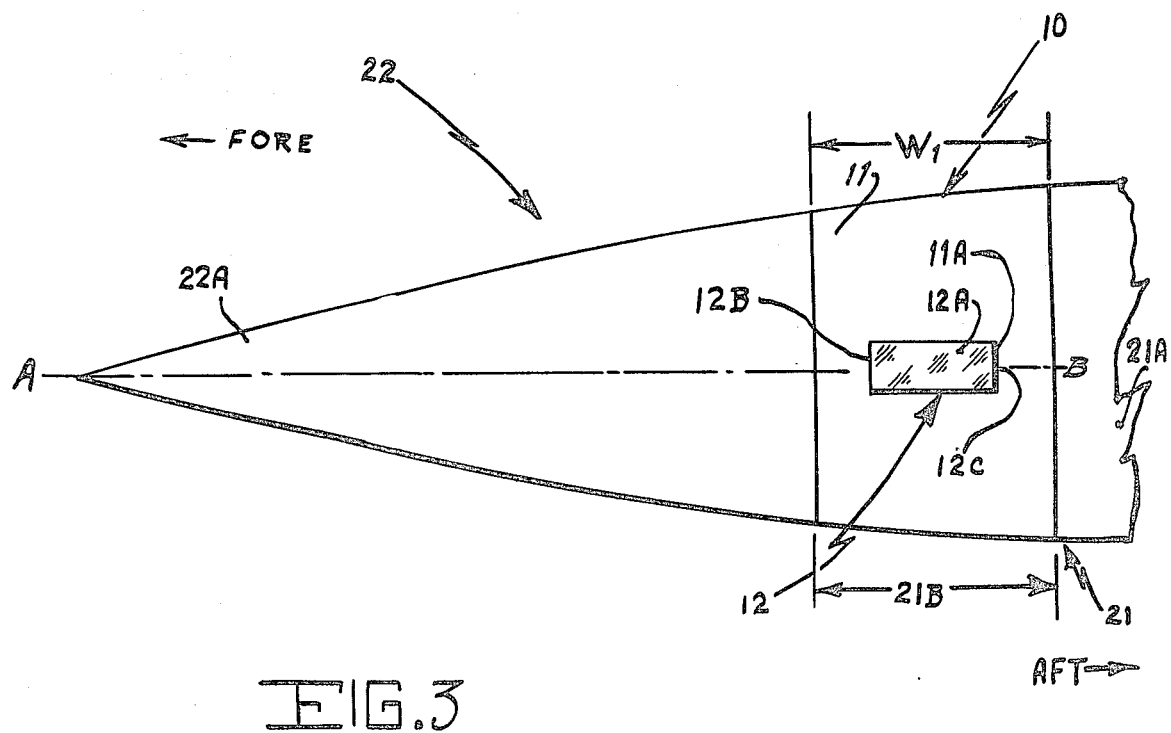

ROTATABLE WINDOW MEANS

STATEMENT OF GOVERNMENT INTEREST

The invention described herein may be manufactured and used by or for the Government for governmental purposes without the payment of any royalty thereon.

BACKGROUND OF THE INVENTION

This invention relates to window means and, more particularly, to window means adapted for use with an aircraft to provide window capability for scanning and for viewing over wide angular regions, without any shadowing while the aircraft is in flight.

Current techniques and apparatus which are used in aircraft to provide window capability for looking out over wide angular regions, such as for the delivery of air-to-ground laser guided weapons, for air-to-air tracking, and for navigation, and the like employ pods attached to the aircraft, or turret structures extending beyond the aircraft moldline. These appendages incur a drag penalty on aircraft performance; and, in addition, they have the inherent disadvantage of being shadowed in one direction by the aircraft to which they are attached.

My inventive window means eliminates, or materially reduces, the drag penalty, and it completely eliminates the shadowing problem by integrating said inventive window means into the aerodynamically configurated fuselage of the aircraft immediately aft of the nose section. I have, thereby, significantly advanced the state-of-the-art.

In addition, my inventive window means solves the air-to-air and navigational requirement for virtually complete spherical coverage, by sensors or otherwise, about the aircraft. Further, my invention permits the use of the interior of the nose section for other functions, such as avionic radar and sensors.

SUMMARY OF THE INVENTION

This invention relates to a novel window means.

An object of this invention is to teach a window means which allows unencumbered viewing over wide angular regions, i.e., in the order of 120° to 150°.

Another object of this invention is to teach an adaptation of my basic window means, wherein the adaptation is for use with an aircraft in the delivery of air-to-ground laser guided weapons, without the penalties which result from the use of external pods or the like protruding into the airstream.

Still another object of this invention is to teach an adaptation of the basic invention, whereby the adaptation solves the air-to-air (and navigational) requirement for virtually complete spherical sensor coverage about the aircraft.

These objects, and other equally important and related objects, of this invention will become readily apparent after a consideration of the description herein of the invention, coupled with reference to the drawings, in the figures of which the same reference numeral or character denotes the same element.

DESCRIPTION OF THE DRAWINGS

FIG. 1 is a side elevation view, partially in cross-section, partially fragmented, and in simplified form, of the nose section of the fuselage of an aircraft into which a preferred embodiment of the inventive window means has been integrated, showing also the wide angular coverage of the invention;

FIG. 2 is a transverse view, partially in cross-section and in simplified form, of the nose section, of part of the fuselage and of the preferred embodiment of the invention, as viewed along line 2—2 in FIG. 1; and, FIG. 3 is a side elevation view, in simplified form, of the external surface nose section of the fuselage, and of the external section of the fuselage immediately aft of the nose section, of the aircraft shown in FIG. 1, and of the external surface of the preferred embodiment of the inventive window means, as integrated into the fuselage.

DESCRIPTION OF THE PREFERRED EMBODIMENT

With reference to FIG. 1, therein is shown a preferred embodiment 10 of my invention as integrated into the aerodynamically configurated fuselage 21, which is immediately aft of the aerodynamically configurated nose section 22 of the fuselage 21 of aircraft 20, which said aircraft is only partially shown in FIG. 1 to maintain simplicity of the drawing. The roll axis of the aircraft 20 is designated A-B; and, the fore end and the aft end of the aircraft 20 are depicted by directional arrows and are labelled with appropriate legends. The fuselage 21 has an external surface 21A with an incomplete portion therein, such as 21B, immediately aft of the nose section 22. That incomplete external surface portion 21B is of a preselected band-like shape having a uniform width (or slant height, as applicable) completely around the fuselage 21.

As shown in FIG. 1, the preferred embodiment of my inventive window means 10, includes but is not limited to: a rotatable band 11 of preselected width $W_1$ made of suitable material and has an opening 11A therein and therethrough; and, a window envelope (or assembly) 12 that is operatively associated with the rotatable band 11 and which includes a transparent windowpane 12A which has a fore end edge 12B and an aft end edge 12C, with the windowpane 12A fitted into, disposed in a flush manner within, and occupying the entire opening 11A in rotatable band 11, with said fore end edge 12B of the windowpane 12A suitably connected (by appropriate conventional means and preferably hingedly) to the rotatable band opening 11A, thereby permitting the outward movement (i.e., downward in FIG. 1) of the windowpane 12A, as shown in phantom in FIG. 1, into the airstream, when desired or needed, by suitable remote or direct means which are well known in the art.

The rotatable band 11 is complete (i.e., structured so that when mounted on the fuselage 21 is "endless" in form); completely encircles that portion of the fuselage 21 which is immediately aft of the nose section 22 and which constitutes the incomplete external surface portion thereof 21B; is fitted within and conforms to the preselected band-like shape of the incomplete surface portion 21B of the fuselage; and, is mounted flush with, and aerodynamically conforms to, the external surface 22A of the nose section 22 and, of course, to the external surface 21A of the fuselage 21.

The window pane 12A, in its closed (i.e., retracted) mode is configured to conform to the aerodynamically configurated external surfaces (i.e., 11A and 22A) of, respectively, the rotatable band 11 and the nose section 22.

Also shown in FIG. 1, for the purpose of showing their relative positional relationship, internal of the aircraft 20, are: a radar transmitter 31; a laser 32; a ranger 33; and, a television sensor 34.

Below the main illustration in FIG. 1, there is depicted a geometric representation of the fields of view afforded by windowpane 12A, when in different positional modes. This aspect and capability of my inventive window means will be discussed further later herein.

With reference to FIG. 2, therein is shown a simplified transverse view of the nose section 22 and of a part of the incomplete external surface of the fuselage 21, FIG. 1, and of the preferred embodiment of my window means 10, FIG. 1, as viewed along line 2—2 of said FIG. 1, but not to scale. With reference to aircraft 20 therein, the pitch axis is designated C–D and the yaw axis is designated E–F. The roll axis (A–B, FIG. 1) is not shown, and it should be imagined as being perpendicular to the sheet of the Figure, at the point of the intersection of axes C–D and E–F. It can be seen from this Figure that windowpane 12A, which is in its retracted (i.e., closed) mode, is flush mounted to conform with the aerodynamic configuration of the external surface 11A of rotatable band 11 which, in turn, is similarly configurated to conform with the aerodynamic configuration of the external surface 22A of the nose section 22 of the aircraft 20. As a related matter, it is to be noted that the interior of the fore end 22B, FIG. 1, of the nose section 22 is available for, and may be dedicated to, the installation and the use of other avionic apparatus, such as sensors and forward looking radar. Additionally, of course, aircraft structure and the like may be carried through the center region 21C of the fuselage 21 portion about which the band 11 is rotatable. Therefore, the volumetric loss which is normally incurred due to the typical swept volume of a sensor is obviated.

With reference to FIG. 3, therein is shown part of the fuselage 21 that incorporates the preferred embodiment 10 of my invention. As can be readily seen in this Figure, the external surface 21A of the fuselage 21 has an incomplete portion 21B therein of a band-like shape and of uniform width $W_1$ (or slant height, as applicable) completely around the fuselage 21, and immediately aft of the nose section 22 of the fuselage 21. The rotatable band 11 of my window means 10 is fitted within that incomplete portion 21B; and, in turn, the windowpane 12A is flush-mounted into the opening 11A of rotatable band 11.

Also shown in FIG. 3 are: the roll axis A–B of aircraft 20; the fore and aft directions of, and relative to, the aircraft 20; the fore end edge 12B of windowpane 12A, by which said edge the windowpane is preferably hingedly connected by suitable means to opening 11A of rotatable band 11; and, the aft end edge 12C which may be moved outwardly (i.e., toward the reader) and into the airstream.

With reference to FIG. 3, it is to be noted that the pre-selected band-like shape of the incomplete external portion 21B of the fuselage 21 may, among other shapes, be conical or cylindrical. Likewise, the complementary rotatable band 11 may be conical (i.e., a hollow frustum of a cone) or cylindrical (i.e., a hollow cylinder). However, irrespective of the shape of the rotatable band 11, the opening 11A of the band may be any convenient shape, although rectangular-like and trapezoidal-like are preferred. The shape of the windowpane 12A is limited and defined by the preselected shape of the rotatable band opening 11A; however, it is obvious that, if a windowpane of a particular shape is desired, the shape of the opening is preselected using that desire as a basis. In this regard, it is to be noted that the term "shape," as used herein, is intended to include size (i.e., dimensions).

MANNER OF OPERATION OF THE PREFERRED EMBODIMENT

The manner of operation of the preferred embodiment of my inventive window means 10, as adapted for particular uses with an aircraft, is readily ascertainable, and is easily understandable, from the foregoing description, coupled with reference to the Figures.

In essence and succinctly, irrespective of the changing degree of roll of the aircraft 20 about roll axis A–B, the windowpane 12A (and any sensor behind the windowpane and/or internal of the rotatable band 11 or opening thereof 11A) can be directed to look over, and continue to keep looking over a region of from 0° to 30° or from 30° to 150° off of the nose of the aircraft, and to do so without shadowing. Alternatively, if the degree of roll is nil, or if the aircraft is kept steady at the same angle, the windowpane 12A (and any sensor behind it, as described herein above) can be directed to look over the entire roll region of the aircraft 20 without shadowing, because of the fully rotatable characteristic and capability of the band 11.

With reference to FIG. 1 and to the geometric representation and illustration therein of the field of view which is obtainable by and with the use of my window means 12, as adapted for use with aircraft 20, one can easily see that, if the windowpane 12A is maintained in the closed (i.e., retracted) mode that, the field of view coverage is 120° and that, if the windowpane 12A is opened outwardly into the airstream (i.e., is in the extended mode), the field of view coverage is 30° additional beyond the 120° region. Therefore, the resultant total coverage (i.e., 30° plus 120°) approaches full spherical capability, because only the rearward or aft 30° region is not covered. Of course, this uncovered 30° region may be covered, and may be viewed, easily and quickly merely by changing the pitch of the aircraft 20.

A typical windowpane, such as 12A, is 7 inches by 20 inches. It is here to be noted that the size of such a windowpane is, uniquely small, when compared with the prior art and when the extremely large angular coverage of 150° is considered. My inventive window means, therefore, would be ideal, in its particular adaptation for use with an aircraft, for wide angle coverage for laser designated weaponry, i.e., air-to-ground laser guided weapons.

CONCLUSION

It is abundantly clear from all of the foregoing, and from the drawings herein, that the hereinbefore stated and desired objects of my invention have been attained. In addition, related desirable objects, also are, have been, and can be attained.

It is to be noted that, although there have been described the fundamental and unique features of my invention as applied to a preferred embodiment, various other embodiments, substitutions, additions, omissions, adaptations, and the like, will occur to, and can be made by, those of ordinary skill in the art, without departing from the spirit of my invention.

What is claimed is:

1. A window means, adapted for use with an aircraft having a roll axis, a fore end, an aft end, and a fuselage with an aerodynamically configured nose section having an external surface and an interior, wherein said fuselage has an external surface with an incomplete portion therein immediately aft of the nose section, with said incomplete external surface portion of the fuselage being of a preselected band-like shape having a uniform width completely around the fuselage, comprising:
   a. rotatable, complete band of suitable material encircling the fuselage immediately aft of the nose section, fitted within and conforming with the shape of the incomplete external surface portion of the fuselage, and mounted flush with, and aerodynamically configurated to conform to, the external surface of the nose section, with said rotatable band having an opening therein;
   b. and, a window envelope that is operatively associated with said rotatable band and which includes a windowpane of transparent material fitted into, disposed in a flush manner within, and occupying the entire said opening in said rotatable band, with said windowpane shaped to conform to the aerodynamic configuration of said rotatable band and having a fore end edge and an aft end edge, and with said windowpane suitably connected at said fore end edge thereof to said rotatable band opening, thereby permitting the selective opening of said windowpane outwardly from said opening of said rotatable band from and at said fore end edge of said windowpane.

2. A window envelope, as set forth in claim 1, wherein said windowpane is connected hingedly at said fore end edge thereof to said opening.

3. A window means, as set forth in claim 1, wherein said preselected band-like shape of the incomplete external portion of the fuselage is conical, and the shape of said rotatable band is in the form essentially of a hollow frustum of a cone which is complementary to the conically shaped incomplete external portion of the fuselage.

4. A window means, as set forth in claim 1, wherein said preselected band-like shape of the incomplete external portion of the fuselage is cylindrical, and the shape of said rotatable band is in the form essentially of a hollow cylinder which is complementary to the cylindrically shaped incomplete portion of the fuselage.

* * * * *